United States Patent
Lambert et al.

(10) Patent No.: US 6,925,344 B1
(45) Date of Patent: Aug. 2, 2005

(54) MAINTAINING SEGMENTATION OF GEOMETRY PIECES IN A COMPUTER AIDED DESIGN (CAD) ENVIRONMENT

(75) Inventors: Mark W. Lambert, Lake Oswego, OR (US); Jeffrey T. Strater, Portland, OR (US)

(73) Assignee: Autodesk, Inc., San Rafael, CA (US)

( * ) Notice: Subject to any disclaimer, the term of this patent is extended or adjusted under 35 U.S.C. 154(b) by 56 days.

(21) Appl. No.: 10/393,511

(22) Filed: Mar. 20, 2003

(51) Int. Cl.$^7$ .................... G06F 19/00; G06T 17/00; G09G 5/00
(52) U.S. Cl. .................... 700/98; 345/660; 345/420
(58) Field of Search .................... 700/98, 1; 345/660, 345/667, 670, 671, 420, 441–443, 664, 665, 666, 669

(56) References Cited

U.S. PATENT DOCUMENTS

| | | | |
|---|---|---|---|
| 5,657,435 A | * | 8/1997 | Watters et al. .......... 345/441 |
| 5,999,186 A | * | 12/1999 | Jackson .......... 345/420 |
| 6,512,519 B1 | * | 1/2003 | Arsenault et al. .......... 345/441 |

* cited by examiner

*Primary Examiner*—Leo Picard
*Assistant Examiner*—R Jarrett
(74) *Attorney, Agent, or Firm*—Fish & Richardson P.C.

(57) ABSTRACT

The invention includes computer instructions that operate to receive an indication of a modification of a geometry piece in a computer aided design (CAD) application. The geometry piece being of at least two segments and each of the two segments having a first length substantially equal to each other. The instructions further operate to automatically modify the two segments into at least two modified segments, where each of the two modified segments having a second length substantially equal to each other. The second length is based at least in part on the received indication of the modification of the geometry piece. As a result, maintaining segmentation of a geometry piece of a mechanical design is facilitated.

18 Claims, 6 Drawing Sheets

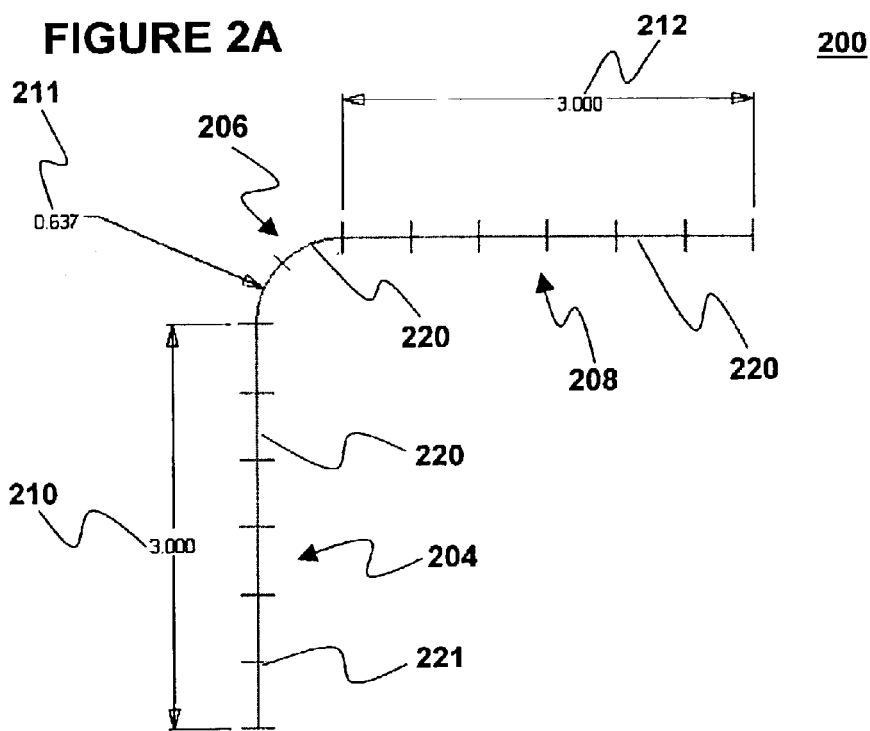
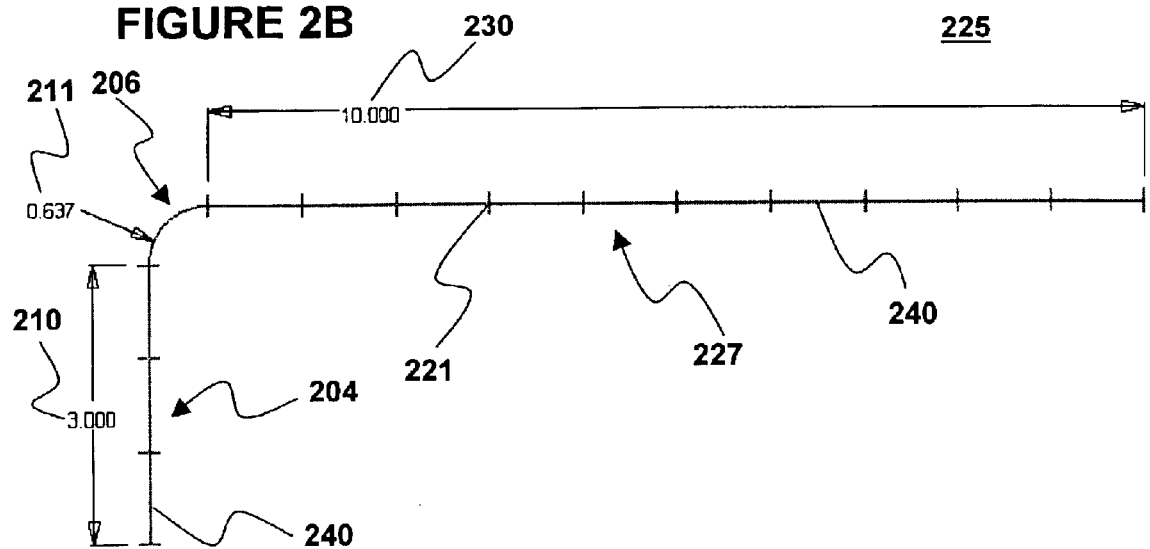

MAINTAINING SEGMENTATION OF GEOMETRY PIECES IN A COMPUTER AIDED DESIGN (CAD) ENVIRONMENT

FIELD OF INVENTION

The present invention relates to the field of computer aided design (CAD) modeling. More specifically, the present invention relates to a simplified method and apparatus for maintaining segmentation of curves.

BACKGROUND OF THE INVENTION

Even though advances in computer aided design (CAD) modeling have facilitated designing parts as 3-D geometry pieces, 2-D geometry pieces may be commonly utilized for various aspects of CAD modeling. That is, often times, in order to generate a solid model, curves may be utilized to form basic shapes, from which, the solid model may be generated. Examples of 3-D geometry pieces may commonly include solid CAD models, hereon out referred as to solid models. Examples of 2-D geometry pieces may commonly include curves such as lines, splines, arcs, edge curves of solid models, etc. hereon out referred to as curves.

Often times, utilization of a curve may involve segmenting the curve, where the location of a segment may aid a user in a design. Because each segment may have two ends (i.e., a beginning and an end), control points may define the two ends of a segment.

For example, a pipe may be designed to have a number of varying cross-sections equally spaced along a path (i.e., its length), where the path may be a complex combination of curves such as, lines, arcs, splines, and so forth. Initially, the user may expend a great deal of effort to divide the path into a number of segments ensuring that the segments are equally spaced on the path (i.e., each control point is equally spaced along the curves). Each of the varying cross-sections may be attached to each of the equally spaced control points.

However, if the path is modified, e.g., one or more of the curves are lengthened, shortened, and so forth, the segments may no longer be equally spaced on the path (i.e., the control points may no longer be equally spaced). In order to maintain equally spaced segments on the modified path, the user may be required to re-segment the modified path by determining new locations for the control points to ensure that the segments are equally spaced on the modified path. Accordingly, modification of segmented curves can be labor intensive and time consuming.

Additionally, if the segments were associated with a solid model such as an edge (i.e., edge curves associated with the edge), modification of the solid model may affect the segments. For example, if a solid model is modified in such a manner that it affects an edge having an edge curve associated with it, the change in the edge may affect the edge curve. That is, the edge curve may be segmented into equal segments, and the modification of the solid model may affect the segments (i.e., the segments may no longer be equal).

BRIEF DESCRIPTION OF DRAWINGS

The present invention will be described by way of exemplary embodiments, but not limitations, illustrated in the accompanying drawings in which like references denote similar elements, and in which:

FIGS. 2A–2B illustrate maintaining segmentation of a geometry piece of a mechanical design, in accordance with one embodiment of the invention;

DETAILED DESCRIPTION OF THE INVENTION

Figure 1:
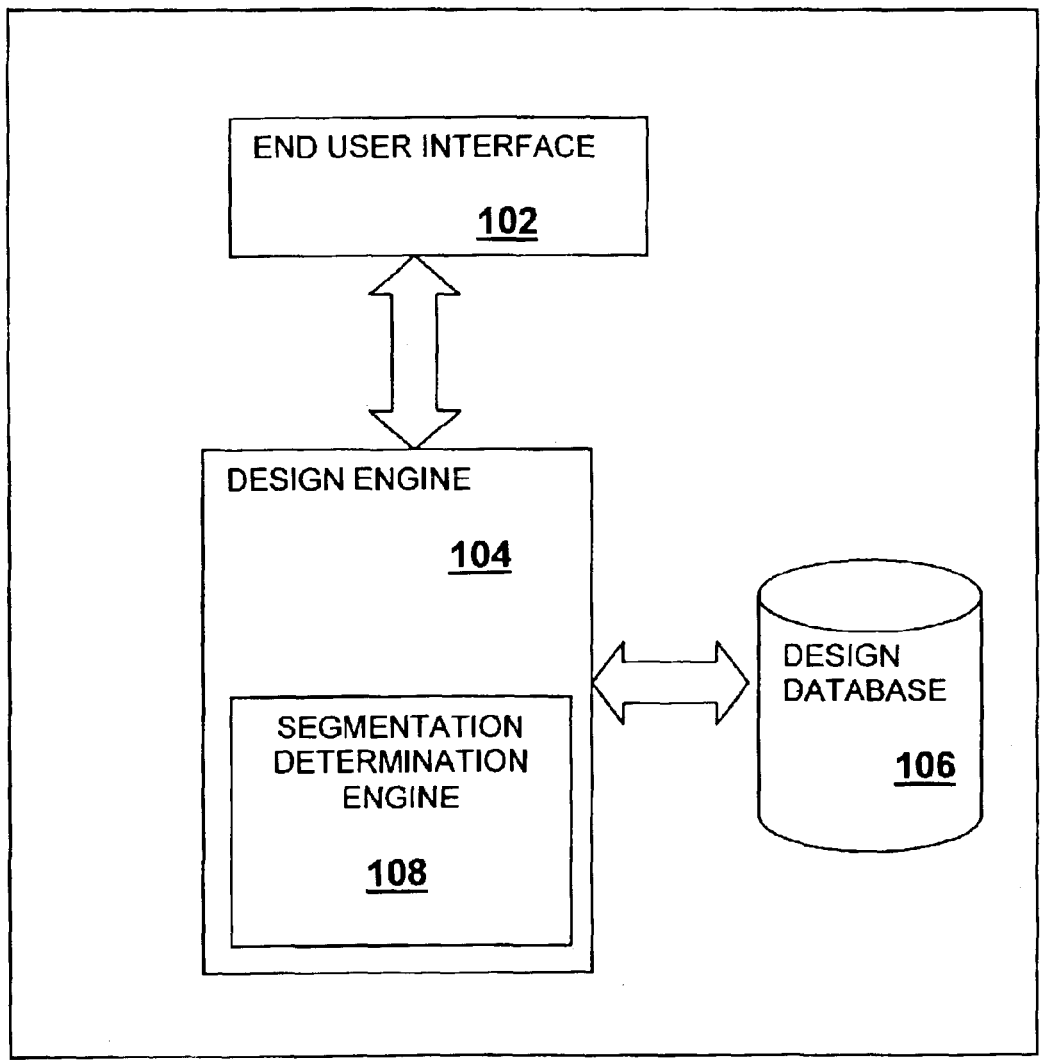
FIG. 1 illustrates a block diagram of one embodiment of a mechanical design application for maintaining segmentation of geometry pieces, in accordance with the invention.

In the following description, various aspects of the invention will be described. However, it will be apparent to those skilled in the art that the invention may be practiced with only some or all described aspects. For purposes of explanation, specific numbers, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system. The term computer system includes general purpose as well as special purpose data processing machines, systems, and the like, that are standalone, adjunct or embedded.

Various operations will be described as multiple discrete operations in turn, in a manner that is most helpful in understanding the invention. However, the order of description should not be construed as to imply that these operations are necessarily order dependent. In particular, these operations need not be performed in the order of presentation.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

For the purposes of describing the invention, in a computer aided design (CAD) environment, a geometry piece may be a 3-D geometry piece such as, but not limited to, solid CAD models, hereon out referred to as solid models. Additionally, a geometry piece may be a 2-D geometry piece, such as, but not limited to, a line, an arc, a spline, an edge curve of a solid model, etc., hereon out referred to as a curve. Additionally, a segment of the curve may be a portion of the curve having a beginning and an end. Accordingly, because each segment may have a beginning and an end, control points may define the location of a segment. That is, the control points aid in defining the segment in the CAD environment.

In various embodiments of the invention, maintaining segmentation of a geometry piece of a mechanical design is facilitated. This and other advantages will be evident from the disclosure.

FIG. 1 illustrates a block diagram of one embodiment of a mechanical design application for maintaining segmentation of geometry pieces, in accordance with the invention. In FIG. 1, mechanical design application 100 includes an end user interface 102, a design engine 104, and a design database 106.

For the illustrated embodiment, the end user interface 102 operates to graphically display and receive input, from a user, of information regarding segmentation under the control of the design engine 104. Under the control of the design engine 104, the design database 106 operates to store the information regarding segmentation.

Additionally, shown in FIG. 1, in accordance with the present invention, design engine 104 is advantageously provided with segmentation determination engine 108. Segmentation determination engine 108 is equipped to receive an indication of a selection of a geometry piece for segmentation. Based at least in part on the received indication, the segmentation determination engine 108 automatically segments the geometry piece into at least two segments, each of the two segments having a first length substantially equal to each other. Further, the segmentation determination engine 108 is equipped to receive an indication of a modification of the geometry piece. Responsive to the received indication of the modification of the geometry piece, the segmentation determination engine 108 automatically modifies the two segments into at least two modified segments, each of the two modified segments having a second length substantially equal to each other. The second length is based at least in part on the received indication of the modification of the geometry piece.

Thus, the segmentation determination engine 108 is advantageously equipped to automatically maintain equal segmentation of a geometry piece in response to a modification of the geometry piece.

Continuing to refer to FIG. 1, in various embodiments, segmentation determination engine 108 is equipped to receive information regarding segmentation geometry pieces that may be 2-D curves. The 2-D curves may be any type of 2-D geometry pieces, such as, but not limited to, lines, arcs, and splines.

In various embodiments, segmentation determination engine 108 is equipped to receive a predetermined number corresponding to the number of segments of the geometry piece. Moreover, the segmentation determination engine 108 is advantageously equipped to automatically shift control points along the geometry piece to maintain the predetermined number corresponding to the number of segments of the geometry piece before the modification. The predetermined number is preferably user configurable for dividing the geometry piece into a number of segments. Alternatively, the predetermined number may be design dependent, such as, but not limited to, a design requiring varying cross-sections along its length, as previously alluded to.

In various embodiments, segmentation determination engine 108 is equipped to segment the geometry piece into segments defined by relative positions of the control points. That is, the segment from one control point to another control point may be defined by the relative positions of the control points and either the magnitudes and directions of a tangent vector between the control points or slope angle of each control point.

In various embodiments, segmentation determination engine 108 is equipped to receive an indication of at least one of a lengthening and shortening of one or more of the geometry pieces.

In various embodiments, segmentation determination engine 108 is equipped to automatically shift the control points along the geometry piece to maintain the predetermined number of segments of the curves before the modification.

Except for the teachings of the present invention incorporated in the segmentation determination engine 108, the mechanical design application 100 is intended to represent a broad range of CAD software known in the art, including but not limited to Autodesk Inventor®, available from Autodesk, Inc. of San Rafael, Calif. Additionally, the mechanical design application 100 may include parametric software components to provide parametric functionality, such as, but not limited to, 2D Dimensional Constraint Manager available from D-Cubed, Ltd. of Cambridge, England.

FIGS. 2A–2B illustrate maintaining segmentation of a geometry piece of a mechanical design, in accordance with one embodiment of the invention. Illustrated in FIG. 2A is a CAD geometry piece with which the invention may be practiced, in particular, a 2-D geometry piece, which may be in the form of a curve 200. The curve 200 may comprise of a first portion 204, a second portion 206, and a third portion 208. Additionally, shown for illustrative purposes, associated with the first portion 204, the second portion 206, and the third portion 208, may be a first, second, and third dimensions 210–212, respectively.

In FIG. 2A, geometrically, the first portion 204 may be a substantially straight line, the second portion 206 may be an arc type coupled to the first portion 204, and the third portion 208 may also be a substantially straight line coupled to the second portion 206. The first portion 204 has the first dimension 210 of 3.000, the second portion 206 has the second dimension 211 of 0.637, and the third portion 208 has the third dimension 212 of 3.000.

Continuing to refer to FIG. 2A, the curve 200 may have a number of segments 220, in accordance with one embodiment of the invention. As shown, each of the segments may be substantially equal in length. That is, in FIG. 2A, responsive to receiving an indication of a selection of the curve 200 for segmentation, segmentation determination engine 108 automatically segments the curve into substantially equal segments 220. The number of segments may be based at least in part on the received indication, whereby the received indication may include a number of segments desired by a user. Accordingly, in one embodiment, once a number of desired segments is received, segmentation determination engine 108 determines a total length of the curve 200 and segments the curve 200 into substantially equal segment 220 based at least in part on the received number of desired segments. For example, the number of segments shown in FIG. 2A is 14.

In order to provide a location for the segments 220, in one embodiment, the segmentation determination engine 108 may visually provide control points 221 at each end of the segments 220. That is, because each segment may have a beginning and an end, control points 221 help define the locations of each segment 220 (i.e., the beginning and the end of each segment 220).

FIG. 2B illustrates maintaining segmentation of the curve 200, responsive to a modification of the curve 200, in accordance with one embodiment of the invention. Shown in FIG. 2B, the third portion 208 has been modified in length resulting in a modified curve 225 having a new dimension 230 for modified portion 227. As previously described, in one embodiment, the segmentation determination engine 108 receives an indication of the modification of the curve 200, and in response, the segmentation engine 108 automatically modifies the segments 220 into modified segments 240. As shown in FIG. 2B, each of the modified segments 240 has a new length substantially equal to each other. That is, the modified curve 225 has substantially the same number of equally spaced segments as before the modification (i.e., 14 equally spaced segments).

In accordance with one embodiment, the locations of the modified segments, in particular, the control points 221 may be determined by determining the overall length of the modified curve 225, and proportionally shifting the control points 221 along the modified curve 225. The control points 221 may be shifted along the modified curve 225 to ensure that the number of modified segments 240 having substantially equal lengths (i.e., equal segments along the length of the curve) is maintained.

As a result, maintaining segmentation of geometry pieces of a mechanical design is facilitated.

It should be appreciated by those skilled in the relevant art that the curve 200 and the modified curve 225 may be a single geometry piece, multiple geometry pieces (e.g., each portion 204, 206 & 208 being separate geometry pieces, a first line, an arc, and a second line), or any combination thereof that are substantially coupled to each coupled. Additionally, the curve 200 may be any type of 2-D geometry piece such as, but not limited to, lines, splines, arcs, edges curves of solid models, etc.

Illustrated in FIGS. 2A–2B, the curves 200 & 225 are an open loop. However, as will be described in further detail, in one embodiment, the curve may be a closed loop such as, but not limited to, a circle.

As previously alluded to, the dimensions 21–212 and 230 are for example purposes, and accordingly, the dimensions may be any dimension. Additionally, the number of segments may be any number of segments (e.g., at least two resulting in forming a segment).

Figure 3A:
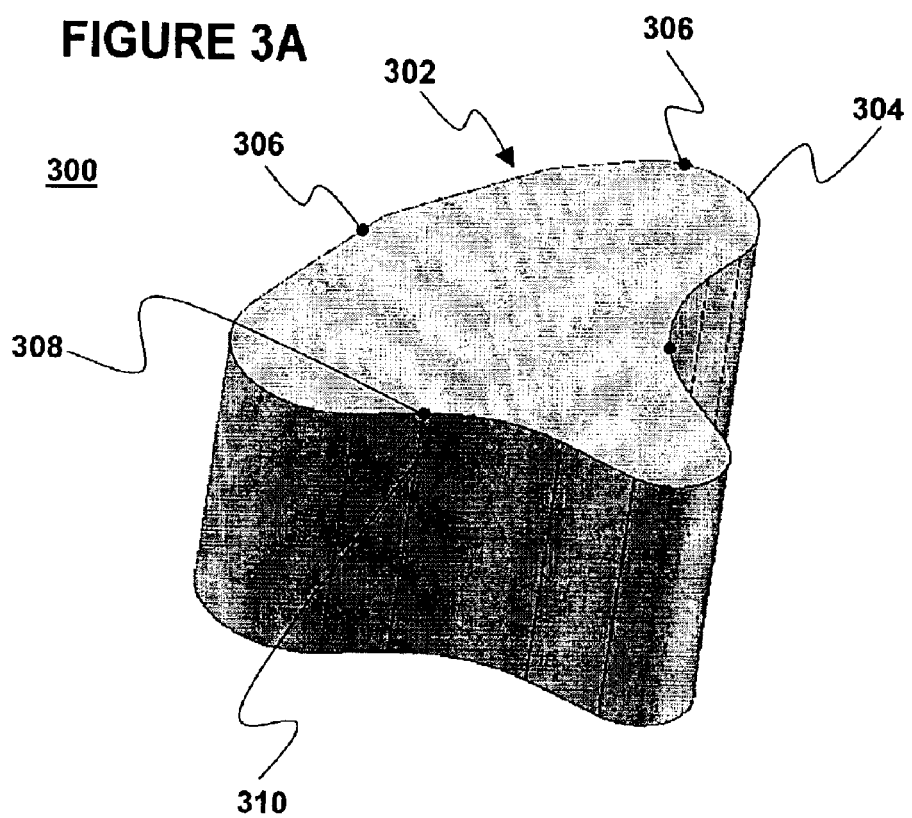
FIGS. 3A–3B illustrate maintaining segmentation of a geometry piece of a mechanical design, in accordance with an alternate embodiment of the present invention.
Figure 3B:
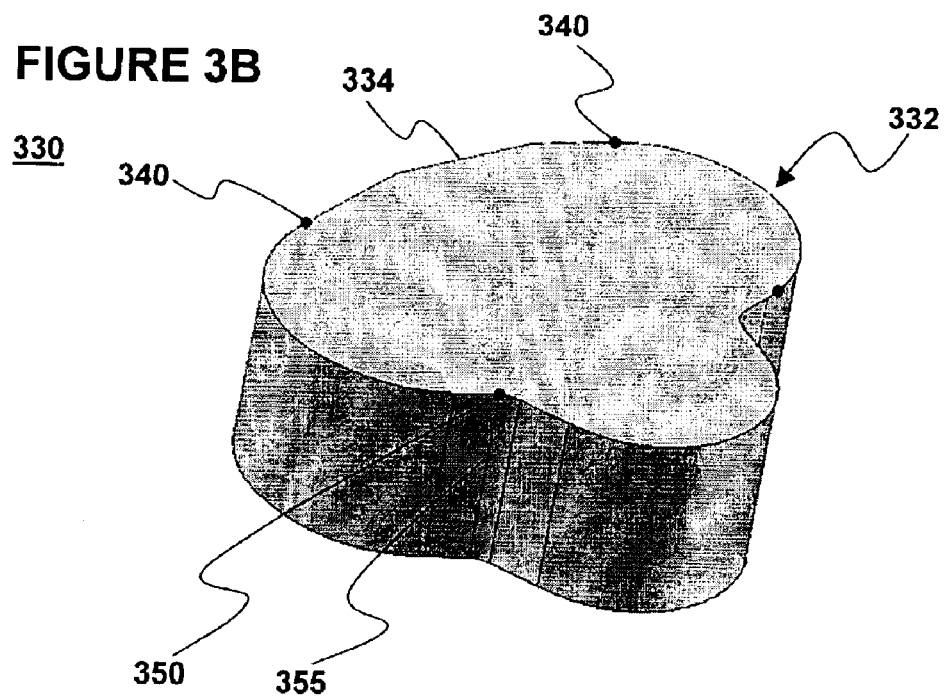

FIGS. 3A–3B illustrate maintaining segmentation of a geometry piece of a mechanical design, in accordance with an alternate embodiment of the present invention. Illustrated in FIG. 3A is a CAD geometry piece with which the present invention may be practiced, in particular, a 3-D geometry piece, which may be in the form of a solid model 300. As illustrated in FIG. 3A, the solid model 300 includes an edge curve 302, and the edge curve 302 has a number of segments 304. Additionally, control points 306 of the segments 304 visually illustrate the locations of the segments 304. That is, they show the beginning and end of each segment 304.

As previously described, the segmentation determination engine 108 receives an indication of a selection of a curve for segmentation, namely the edge curve 302. In response, the segmentation engine 108 automatically segments the edge curve 302 into segments 304 (e.g., 4 in FIG. 3A), where each of the segments 304 have a length substantially equal to each other.

In the illustrated embodiment of FIG. 3A, the edge curve 302 may be referred to as a closed loop because unlike curves 200 & 225 (shown in FIGS. 2A–B), the edge curve 302 of the solid model 300 does not necessarily have ends. Accordingly, in the embodiment of FIG. 3A, having received the indication of selection of a curve for segmentation, which may include the desired number of segments, segmentation termination engine 108 determines a first location 308 of the control point 306 from which the automatic segmentation of the edge curve 302 may initiate. That is, the first location 308 of the control point 306 facilitates segmentation of the edge curve 302 (i.e., a closed loop) that does not have ends.

For example, illustrated in FIG. 3A, in order to determine the first location 308 of the edge curve 302, segmentation determination engine 108 may utilize a visual type entity 310 such as, but not limited to, a silhouette visual entity. That is, the segmentation determination engine 108 may determine that the visual type entity 310 is closed in proximity to a received cursor selection by the user on the edge curve 302. Alternatively, the first location 308 may be any location selected by the user utilizing the cursor on the edge curve 302.

Turning now to FIG. 3B, maintaining segmentation of the edge curve 302, responsive to a modification of the edge curve 302, in accordance with one embodiment of the present invention is illustrated. In FIG. 3B, the solid model 300 of FIG. 3A is shown modified resulting a modified solid model 330. In particular, the modification also affected the edge curve 302 of FIG. 3A resulting in a modified edge curve 332. In accordance with the teachings of the invention, responsive to receiving an indication of a modification of the edge curve 302, segmentation determination engine 108 automatically modifies the segments 304 into modified segments 334. As shown in FIG. 3B, each of the modified segments 334 has a new length substantially equal to each other. That is, the modified edge curve 332 has substantially the same number of equally spaced segments as before the modification (i.e., 4 equally spaced segments). Additionally, modified control points 340 are illustrated to visually represent the locations of the modified segments 334.

Here again, illustrated in FIG. 3B, segmentation determination engine 108 determines a first location 350 of the modified control point 340 from which the automatic segmentation of the modified edge curve 302 may initiate. In the illustrated embodiment, segmentation determination engine 108 determined the first location 350 of the modified control point 340 substantially similarly to the first location 308 of the control point 306 in FIG. 3A. That is, the first location 350 of the modified control point 340 may be in close proximity to the visual type entity 355 on the modified solid model 330. Alternatively, the first location 350 of the modified control points 306 may be any location selected by the user utilizing the cursor on the modified edge curve 332.

As a result, maintaining segmentation of a geometry piece of a mechanical design, such as solid models, is facilitated.

In FIGS. 3A–3B, the edge curves 302 & 332 are shown as closed loops. However, it should be appreciated by those skilled in the art that the edge curves may also include open loops having ends. Additionally, as previously described, the edge curves 302 & 332 may be a single edge curve, a combination of various single edge curves, or any combination thereof. Furthermore, the edge curves may be any type of curve like entities on a solid model such as, but not limited to, contour-type entities on surfaces.

Figure 4A:
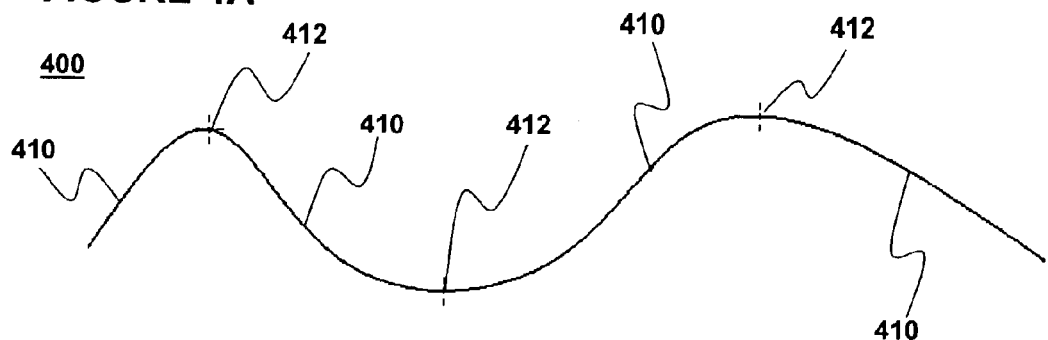
FIGS. 4A–4C illustrate maintaining segmentation of a geometry piece of a mechanical design for a combination of 2-D and 3-D geometry pieces, in accordance with another embodiment of the present invention.
Figure 4B:
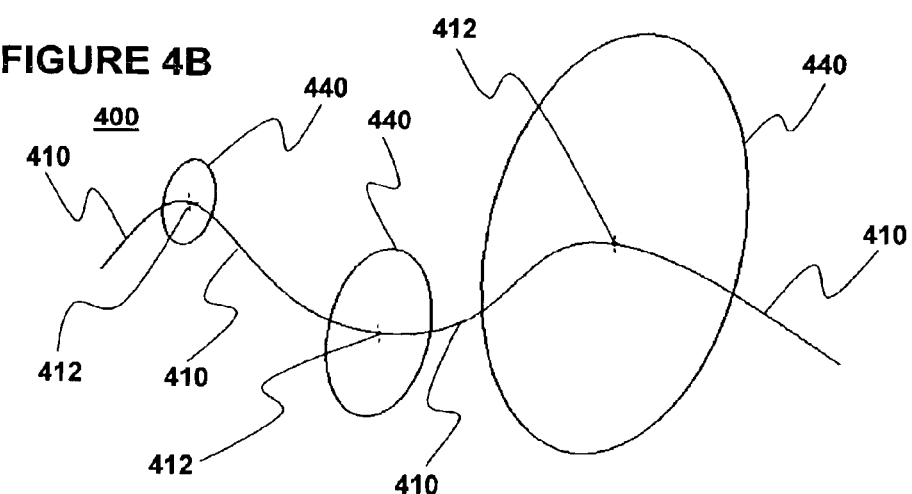
Figure 4C:
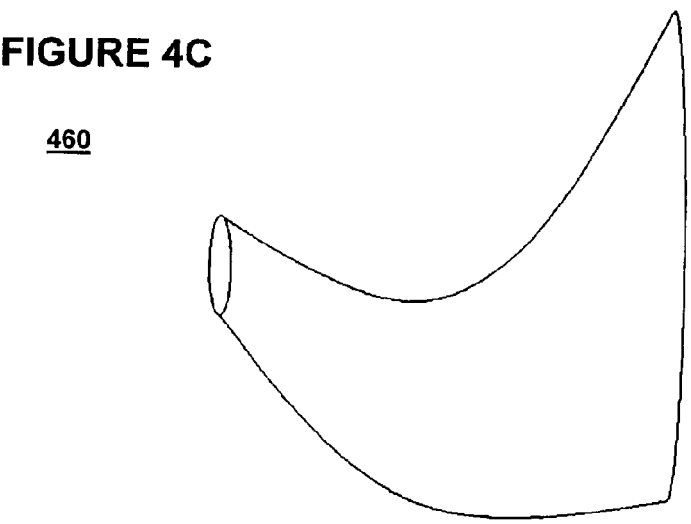

FIGS. 4A–4C illustrate maintaining segmentation of a geometry piece of a mechanical design for a combination of 2-D and 3-D geometry pieces, in accordance with another embodiment of the present invention. As illustrated in FIGS. 4A–4C, a 2-D geometry piece in the form of a curve 400 has at least two segments, namely 4 segments 410. Associated with each of the segments 410 is a control point 412. Referring now to FIG. 4B, the curve 400 may be a path having various cross-sections 440 for a 3-D geometry piece such as, but not limited to, a pipe like solid model 460 shown in FIG. 4C. The locations of the various cross-sections 440 may be defined by the control points 412. That is, each section 410 may have a length along the curve 400 substantially equal to each other, while still having a different cross-sectional area.

Thus, under the teachings of the invention, segmentation determination engine 108 may automatically segment and maintain segmentation, as described above, responsive to modifications in the solid model 460, the curve 400, or any combination thereof.

Figure 5:
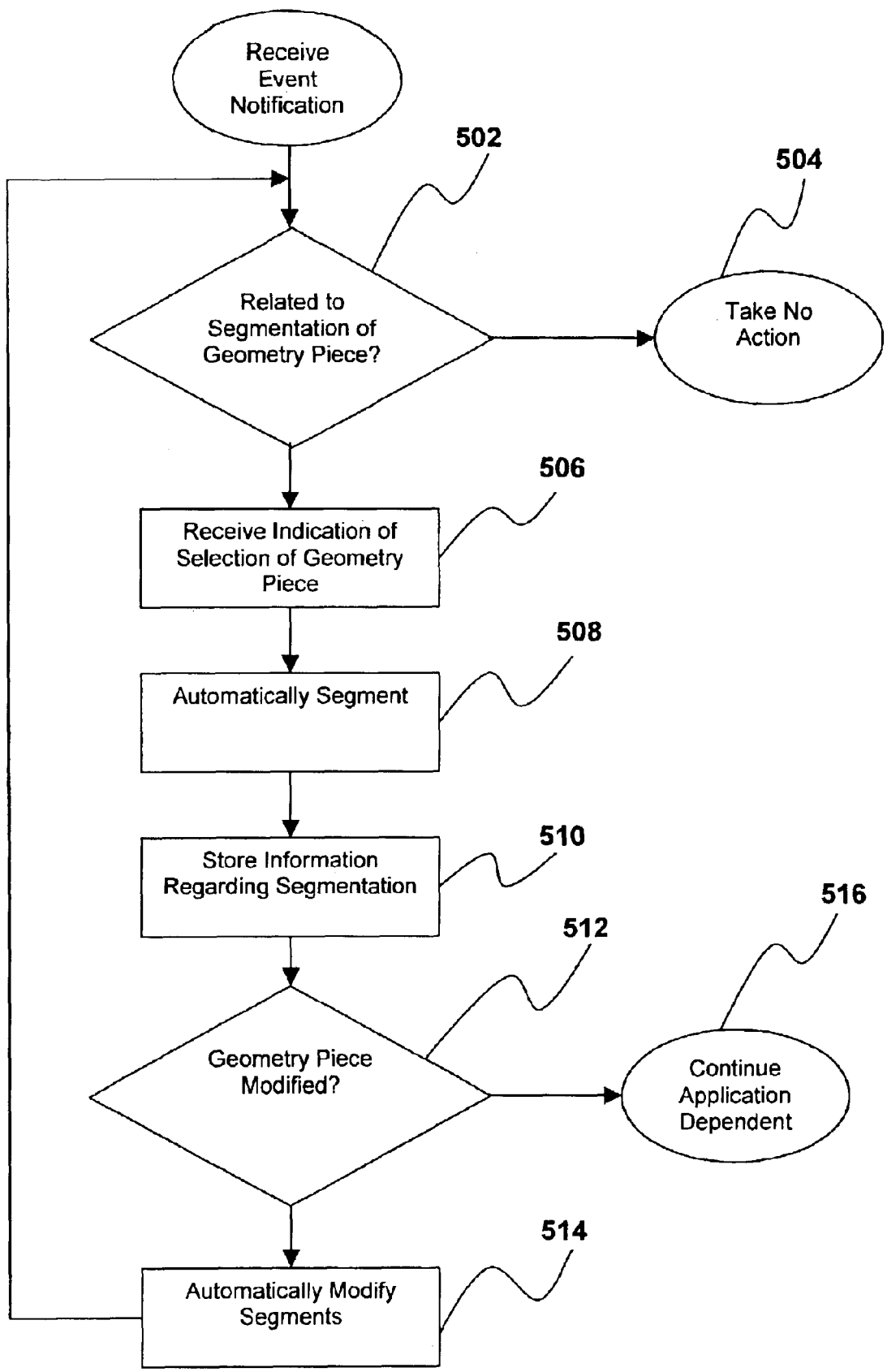
FIG. 5 illustrates the operational flow of some aspects of a segmentation determination engine for maintaining segmentation of a geometry piece, in accordance with one embodiment of the invention.

FIG. 5 illustrates the operational flow of some aspects of a segmentation determination engine 108 of FIG. 1 for maintaining segmentation of a geometry piece, in accordance with one embodiment of the invention. For the illustrated embodiment, segmentation determination engine 108 may be programmed in accordance with an event driven model (i.e., segmentation determination engine 108 may be executed in a system where various event notification services are available from the operating system). One example of such an operation system suitable for practicing the invention is the Windows® operating system, available from Microsoft Corporation of Redmond, Wash. In alternate embodiments, segmentation determination engine 108 may be implemented in other programming approaches known in the art.

At operational block 502, segmentation determination engine 108 determines if an event notification is related to segmentation of a geometry piece. If it is determined that the received event notification is not related to a segmentation of a geometry piece, the design segmentation determination engine 108 takes not action, operational block 504. However, if an event notification is related to a segmentation of a geometry piece, segmentation determination engine 108 is equipped to receive an indication of a selection of a geometry piece segmentation, operational block 506.

At operational block 508, responsive to the received indication of the selection of the geometry piece for segmentation, segmentation determination engine 108 automatically segments the geometry piece into at least two segments, based at least in part on the received indication of the selection of the geometry piece. Each of the segments has a length substantially equal to each other. The segmentation information may be stored in the design database 106, at operational block 510.

Once segmentation information is stored in the design database 106, it is determined if an indication of a modification of the geometry piece is received at block 512. If it is determined that an indication of a modification of the geometry piece is received, segmentation determination engine 108 automatically modifies the segments at operational block 514. Each of the two modified segments having a new length substantially equal to each other, the new length based at least in part on the received indication of the modification of the geometry piece. As previously described, segmentation determination engine 108 may retrieve various information regarding segmentation such as, but not limited to, a number of segments to facilitate modification of the segments. Else, operation continues in an application dependent manner at block 516.

As a result, maintaining segmentation of a geometry piece of a mechanical design is facilitated.

Figure 6:
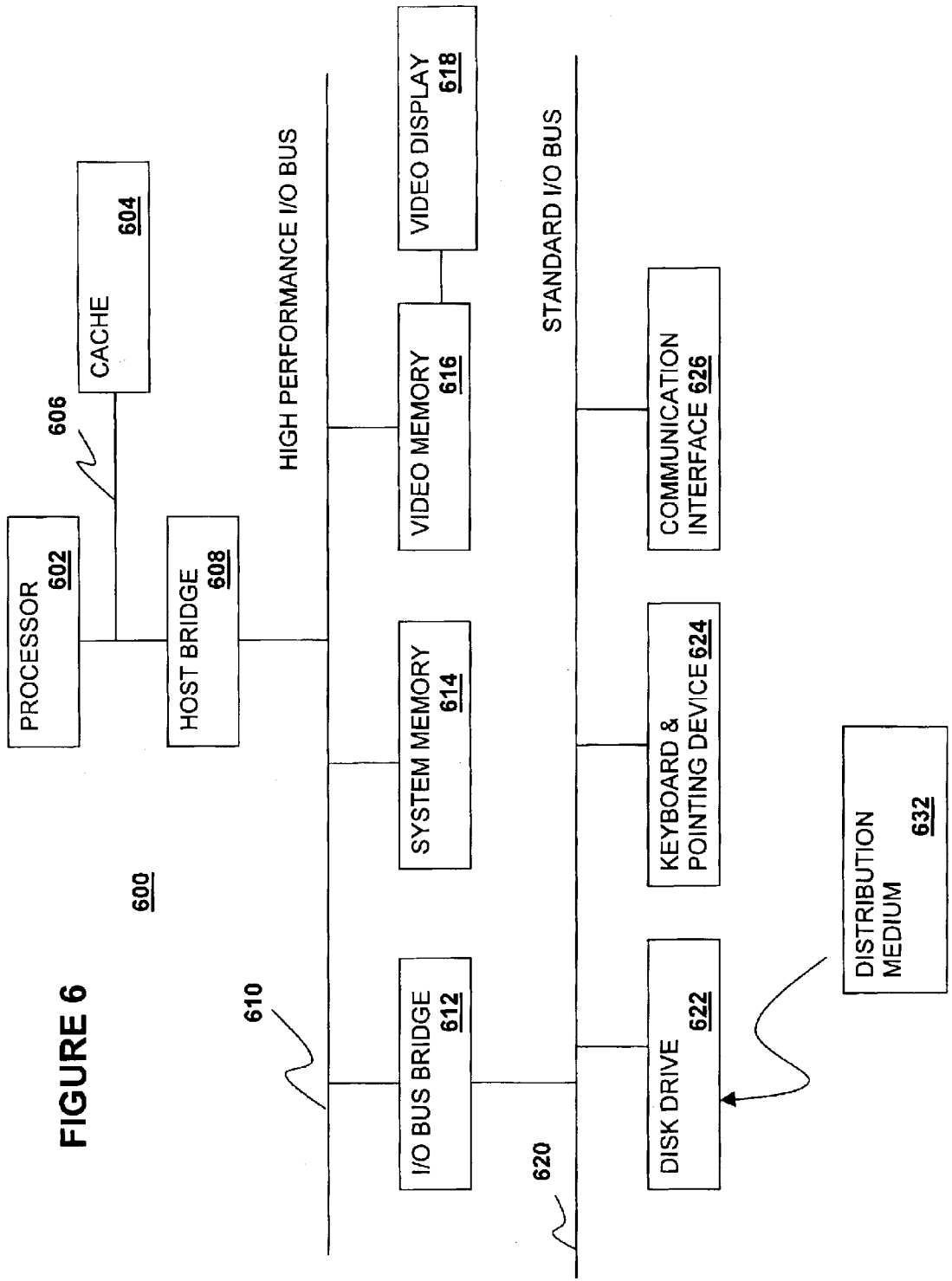
FIG. 6 illustrates one embodiment of a computer system suitable to be programmed with the mechanical design application of the invention.

FIG. 6 illustrates one embodiment of a computer system suitable to be programmed with the mechanical design application of the invention. As shown, for the illustrated embodiment, computer 600 includes processor 602, processor bus 606, high performance I/O bus 610 and standard I/O bus 620. Processor bus 606 and high performance I/O bus 610 are bridged by host bridge 608, whereas I/O buses 610 and 612 are bridged by I/O bus bridge 612. Coupled to processor bus 606 is cache 604. Coupled to high performance I/O bus 610 are system memory 614 and video memory 616, against which video display 618 is coupled. Coupled to standard I/O bus 620 are disk drive 622, keyboard and pointing device 624, and communication interface 626.

These elements perform their conventional functions known in the art. In particular, disk drive 622 and system memory 614 are used to store permanent and working copies of the mechanical design system. The permanent copies may be pre-loaded into disk drive 622 in factory, loaded from distribution medium 632, or down loaded from a remote distribution source (not shown). Distribution medium 632 may be a tape, a CD, a DVD or other storage medium of the like. The constitutions of these elements are known. Any one of a number of implementations of these elements known in the art may be used to form computer system 600.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

In alternative embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, maintaining segmentation of geometry piece of a mechanical design has been described.

What is claimed is:

1. A method of operation, comprising:

receiving an indication of a selection of a geometry piece for segmentation in a computer aided design (CAD) application;

automatically segmenting the geometry piece into at least two segments, based at least in part on the received indication of the selection of the geometry piece, each of the at least two segments having a first length substantially equal to each other;

receiving an indication of a modification of the geometry piece; and automatically modifying the two segments into at least two modified segments, each of the at least two modified segments having a second length substantially equal to each other, the second length based at least in part on the received indication of the modification of the geometry piece, where a total number of segments of the geometry piece after the modification of the geometry piece is a same as a total number of segments before the modification of the geometry piece.

2. The method of operation of claim 1, wherein said receiving an indication of a selection comprises receiving an indication of a selection of a CAD 2-D curve.

3. The method of operation of claim 1, wherein said receiving an indication of a selection comprises receiving an indication of a selection of an edge curve of a CAD solid model.

4. The method of operation of claim 1, wherein said receiving an indication of a selection comprises receiving an indication of a number of segmentations of the geometry piece.

5. The method of operation of claim 1, wherein said receiving an indication of a selection comprises receiving an indication of a location of a control point between the at least two segments.

6. The method of operation of claim 1, wherein said automatically segmenting the geometry piece comprises automatically determining a location of a control point between the at least two segments based at least in part on a geometric property of the geometry piece.

7. An apparatus comprising:
a storage medium having stored therein a plurality of programming instructions, which when executed, the programming instructions cause the apparatus to,
receive an indication of a selection of a geometry piece for segmentation in a computer aided design (CAD) application,
automatically segment the geometry piece into at least two segments, based at least in part on the received indication of the selection of the geometry piece, each of the at least two segments having a first length substantially equal to each other, receive an indication of a modification of the geometry piece, and
automatically modify the at least two segments into at least two modified segments, each of the at least two modified segments having a second length substantially equal to each other, the second length based at least in part on the received indication of the modification of the geometry piece, where a total number of segments of the geometry piece after the modification of the geometry piece is a same as a total number of segments before the modification of the geometry piece; and
a processing coupled to the storage medium to execute the programming instructions.

8. The apparatus of claim 7, wherein the programming instructions, which when executed, cause the apparatus to receive an indication of a selection of a CAD 2-D curve.

9. The apparatus of claim 7, wherein the programming instructions, which when executed, cause the apparatus to receive an indication of a selection of an edge curve of a CAD solid model.

10. The apparatus of claim 7, wherein the programming instructions, which when executed, cause the apparatus to receive an indication of a number of segmentations of the geometry piece.

11. The apparatus of claim 7, wherein the programming instructions, which when executed, cause the apparatus to receive an indication of a location of a control point between the at least two segments.

12. The apparatus of claim 7, wherein the programming instructions, which when executed, cause the apparatus to automatically determine a location of a control point between the at least two segments based at least in part on a geometric property of the geometry piece.

13. An article of manufacture having stored therein a plurality of programming instructions, which when executed, the instruction cause a machine to:
receive an indication of a selection of a geometry piece for segmentation in a computer aided design (CAD) application;
automatically segment the geometry piece into at least two segments based at least in part on the received indication of the selection of the geometry piece, each of the at least two segments having a first length substantially equal to each other;
receive an indication of a modification of the geometry piece; and
automatically modify the two segments into at least two modified segments, each of the at least two modified segments having a second length substantially equal to each other, the second length based at least in part on the received indication of the modification of the geometry piece, where a total number of segments of the geometry piece after the modification of the geometry piece is a same as a total number of segments before the modification of the geometry piece.

14. The article of manufacture of claim 13, wherein said programming instruction, which when executed, cause the machine to receive an indication of a selection of a CAD 2-D curve.

15. The article of manufacture of claim 13, wherein said programming instructions, which when executed, cause the machine to receive an indication of a selection of an edge curve of a CAD solid model.

16. The article of manufacture of claim 13, wherein said programming instructions; which when executed, cause the machine to receive an indication of a number of segmentations of the geometry piece.

17. The article of manufacture of claim 13, wherein said programming instructions, which when executed, cause the machine to receive an indication of a location of a control point between the at least two segments.

18. The article of manufacture of claim 13, wherein said programming instructions to automatically segment the geometry piece include programming instructions to automatically determine a location of a control point between the at least two segments based at least in part on a geometric property of the geometry piece.

* * * * *